United States Patent
Aubrion et al.

(10) Patent No.: US 11,885,307 B2
(45) Date of Patent: Jan. 30, 2024

(54) LIGHTNING PROTECTION OF A SECTION WIND TURBINE BLADE

(71) Applicant: LM WIND POWER A/S, Kolding (DK)

(72) Inventors: Mathilde Aubrion, Kolding (DK); Boas Eiriksson, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 17/285,863

(22) PCT Filed: Oct. 24, 2019

(86) PCT No.: PCT/EP2019/079017
§ 371 (c)(1),
(2) Date: Apr. 15, 2021

(87) PCT Pub. No.: WO2020/084045
PCT Pub. Date: Apr. 30, 2020

(65) Prior Publication Data
US 2021/0355919 A1    Nov. 18, 2021

(30) Foreign Application Priority Data

Oct. 25, 2018 (EP) ..................................... 18202655

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *F05B 2240/302* (2013.01)

(58) Field of Classification Search
CPC .... F03D 1/0633; F03D 1/0641; F03D 1/0675; F03D 1/0683; F03D 80/30; F05B 2240/302
See application file for complete search history.

(56) References Cited

U.S. PATENT DOCUMENTS 8,142,157 B2 * 3/2012 Kita ........................ F03D 80/00
416/224
8,562,296 B2 * 10/2013 Arocena De La Rua ...................
F03D 80/30
416/232

(Continued)

FOREIGN PATENT DOCUMENTS

EP    2243955 A2    10/2010
EP    3299618 A1    3/2018

(Continued)

OTHER PUBLICATIONS

International Search Report dated Jan. 21, 2021 for International application No. PCT/EP2019/079017.

*Primary Examiner* — Courtney D Heinle
*Assistant Examiner* — Sang K Kim
(74) *Attorney, Agent, or Firm* — Nath, Goldberg & Meyer; Jerald L. Meyer; Tanya E. Harkins

(57) ABSTRACT

Disclosed is a wind turbine blade comprising a first blade section extending along a longitudinal axis from a root end to a first end and a second blade section extending along the longitudinal axis from a second end to a tip end. The wind turbine blade comprising a spar beam configured for connecting the first blade section and the second blade section. The first blade section comprises a first down conductor and the second blade section comprises a second down conductor. The wind turbine blade comprises a conductive connector element for electrically connecting the first down conductor and the second down conductor.

16 Claims, 11 Drawing Sheets

(56) References Cited

U.S. PATENT DOCUMENTS

| | | | | |
|---|---|---|---|---|
| 10,844,844 B2* | 11/2020 | Lee | ............ | F03D 1/0675 |
| 2008/0240925 A1* | 10/2008 | Kita | ............ | F03D 80/30 |
| | | | | 416/230 |
| 2014/0286780 A1* | 9/2014 | Lemos | ............ | F03D 80/50 |
| | | | | 29/889.71 |
| 2015/0132137 A1* | 5/2015 | Humblot | ............ | F01D 5/282 |
| | | | | 156/92 |
| 2018/0274521 A1* | 9/2018 | Akhtar | ............ | F03D 80/30 |
| 2021/0396215 A1* | 12/2021 | Avaldi | ............ | F03D 1/0675 |

FOREIGN PATENT DOCUMENTS

| | | |
|---|---|---|
| JP | 2014051921 A | 3/2014 |
| WO | 2018101632 A1 | 6/2018 |

* cited by examiner

LIGHTNING PROTECTION OF A SECTION WIND TURBINE BLADE

This is a National Phase Application filed under 35 U.S.C. 371 as a national stage of PCT/EP2019/079017, filed Oct. 24, 2019, an application claiming the benefit of European Application No. 18202655.9, filed Oct. 25, 2018, the content of each of which is hereby incorporated by reference in its entirety.

The present disclosure relates to lightning protection of a wind turbine blade, more specifically the disclosure relates to lightning protection of a wind turbine blade comprising a first blade section and a second blade section, and optionally more blade sections.

BACKGROUND

As wind turbines and wind turbine blades increase in size, the risk of lighting striking the wind turbine increases. It is therefore of increasing interest to provide wind turbines and in particular wind turbine blades with lightning protection measures.

It is known to provide blades for wind turbines with lightning receptors that are, inside the blade, in electric connection with a metallic down conductor that is able to connect a lightning current to earth.

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Afterwards, the two halves are positioned on top of each other, and the two halves are glued together. The blade parts may be positioned on top of each other by turning and repositioning the complete half mould.

As the demand for blades for wind turbines tends towards blades of increasing lengths, a need concurrently arises for manufacture of blades having increased rigidity and a comparatively lower weight. One way of achieving these properties is to combine various types of fibres in the laminate of the blades, for instance it is an option to combine glass fibres and carbon fibres, and likewise carbon fibres or glass fibres may advantageously be combined with steel fibres. Combinations with other types of fibres are thus also possible and it is also an option to exclusively employ carbon fibres or other suitable fibre types. Combination of e.g. glass fibres with carbon fibres in a so-called hybrid laminate may possess a problem in that some of the fibre types are electrically conductive, e.g. carbon fibres and steel fibres. A lightning strike directly into the laminate may cause damage to a blade comprising electrically conductive fibres, as they would conduct the current and thereby i.a. be greatly heated. This is particularly problematic in case of fibres having comparatively poor conductivity, such as carbon fibres, and in case of hybrid laminates with fibres in e.g. mat-shape, where the individual mat may e.g. have a small portion of electrically conductive fibres and a larger portion of e.g. glass fibres that are not electrically conductive.

Further as the demands for blades for wind turbines tend towards blades of increasing lengths, attention is increasing on concepts of manufacturing blades in sections for being assembled at the installation site. Elements provided for allowing a secure and reliable connection between individual sections of the wind turbine blade bring about another challenge to protect the wind turbine blade from damages caused by lightning strikes. Such wind turbine blade, comprising a plurality of sections, may be known as a split blade, or two-part blade, or segmented blade or similar.

SUMMARY

It is an object of the present disclosure to provide ways for lightning protection of a wind turbine blade, such as a split/segmented blade, where the wind turbine blade is manufactured by manufacturing two (or more) blade sections and then joining them. In particular, it is an objective of the present disclosure to provide coupling for a wind turbine blade comprising a first and a second down conductor, adapted for lightning protection, e.g. for protecting the wind turbine blade against lightning strikes, e.g. in a more advantageous way.

The present disclosure provides ways of improving lightning protection of a wind turbine blade, in particular being a split/segmented blade. The disclosure advantageously provides ways of combining different lightning protection concepts, facilitating decreased risk of damaging lightning strikes, and reducing material costs and production costs.

Accordingly, a wind turbine blade is disclosed, such as a wind turbine blade extending along a longitudinal axis from a root end through a first airfoil region and a second airfoil region to a tip end. The wind turbine blade may comprise a first blade section and a second blade section. The wind turbine blade may be a split blade, or two-part blade, or segmented blade. The first blade section extends along the longitudinal axis from to a first end. The second blade section extends along the longitudinal axis from a second end towards the tip end. The first blade section may extend from the root. The second blade section may extend to the tip end. The first blade section may comprise a root region, optionally including the root end. The first blade section may comprise the first airfoil region. The first blade section may comprise a transition region between the root region and the first airfoil region. The second blade section may comprise the second airfoil region. The second airfoil region may comprise the tip end. The first blade section and the second blade section may comprise a pressure side and a suction side. The first blade section and the second blade section may comprise a chord line extending between a leading edge and a trailing edge.

The wind turbine blade comprises a spar beam configured for connecting, e.g. structurally connecting, the first blade section and the second blade section. The spar beam may longitudinally extend along a spar beam axis from a first beam position, e.g. a first beam end, to a second beam position, e.g. a second beam end. The spar beam axis may be substantially parallel to the longitudinal axis of the wind turbine blade. The spar beam is configured to be positioned such that the first beam position is located in the first airfoil region and the second beam position is located in the second airfoil region. The spar beam may be configured to be positioned such that a third beam position, between the first beam position and the second beam position, is aligned with the second end of the second blade section and/or the first end of the first blade section.

The first blade section comprises a first down conductor. The second blade section comprises a second down conductor. The wind turbine blade comprises a conductive connector element for electrically connecting the first down conductor and the second down conductor. The second down conductor may be connected to a lightning receptor, such as a lightning receptor positioned at or near the tip end. For example, the second down conductor may extend from the lightning receptor.

It is an advantage of the present disclosure, that lightning protection for a segmented wind turbine blade, in particular a segmented wind turbine blade utilizing a spar beam for connecting sections of the wind turbine blade, may be provided and enhanced.

It is an advantage of the present disclosure that assembly of a segmented wind turbine blade may be improved by having a first and a second down conductor. It is a further advantage of the present disclosure that the assembly of a segmented wind turbine blade is made easier, more convenient and more flexible. Such advantage may particularly be achieved by the first blade section comprising a first down conductor and the second blade section comprising a second down conductor, which may be manufactured separately. Blade sections and down conductors may be assembled and connected at the same time providing for a faster assembly of the wind turbine blade.

Also disclosed is a method for assembling a wind turbine blade, such as a wind turbine blade as disclosed above, extending along a longitudinal axis from a root end through a first airfoil region and a second airfoil region to a tip end. The wind turbine blade comprises a first blade section extending along the longitudinal axis to a first end and a second blade section extending along the longitudinal axis from a second end towards the tip end. The first blade section may extend from the root. The second blade section may extend to the tip end. The first blade section may comprise a root region, optionally including the root end. The first blade section may comprise the first airfoil region. The first blade section may comprise a transition region between the root region and the first airfoil region. The second blade section may comprise the second airfoil region. The second airfoil region may comprise the tip end. The first blade section and the second blade section comprise a pressure side and a suction side. The first blade section and the second blade section may comprise a chord line extending between a leading edge and a trailing edge. The wind turbine blade comprises a spar beam configured for connecting, such as structurally connecting, the first blade section and the second blade section. The spar beam longitudinally extends along a spar beam axis from a first beam position, e.g. a first beam end, to a second beam position, e.g. a second beam end. The spar beam axis may be substantially parallel to the longitudinal axis of the wind turbine blade. The first blade section comprises a first down conductor and the second blade section comprises a second down conductor.

The method comprises positioning the spar beam such that the first beam position is located in the first airfoil region and the second beam position is located in the second airfoil region. Positioning the spar beam may comprise that a third beam position, between the first beam position and the second beam position, is aligned with the second end of the second blade section and/or the first end of the first blade section.

The method further comprises electrically connecting the first down conductor and the second down conductor with a conductive connector element.

The conductive connector element may be formed by a plurality of conductive connector elements. For example, the conductive connector element may comprise a first conductive connector element. The first conductive connector element may be in electrical connection with the first down conductor. The conductive connector element may comprise a second conductive connector element. The second conductive connector element may be in electrical connection with the second down conductor. The first conductive connector element and the second conductive connector element may be configured to couple, e.g. to electrically connect the first down conductor and the second down conductor.

Electrically connecting the first down conductor and the second down conductor may comprise coupling the first conductive connector element and the second conductive connector element.

The first conductive connector element may form part of the first down conductor. The second conductive connector element may form part of the second down conductor.

The conductive connector element and/or the first conductive connector element and/or the second conductive connector element may be located in the first blade section. Alternatively or additionally, the conductive connector element and/or the first conductive connector element and/or the second conductive connector element may be located in the second blade section.

The first conductive connector element and the second conductive connector element may form a plug and a socket. For example, the first conductive connector element may be a plug. The second conductive connector element may be a socket. The first conductive connector element may be configured to engage with the second conductive connector element.

Coupling the first conductive connector element and the second conductive connector element may comprise clamping, soldering, bolting or mating the first conductive connector element and the second conductive connector element.

The first down conductor may be located at a first primary distance from the pressure side, e.g. of the first blade section, and a first secondary distance from the suction side, e.g. of the first blade section.

The first primary distance and the first secondary distance along a first primary part may be substantially the same. For example, the first primary distance and the first secondary distance may be substantially the same throughout the majority of the first blade section.

In some portions of the wind turbine blade, the first primary distance and the first secondary distance may be different, e.g. to allow space for other components of the wind turbine blade and/or to allow for an easier connection of elements, such as connection the first down conductor and the second down conductor. For example, the first primary distance may be smaller than the first secondary distance along a first secondary part. Alternatively, the first primary distance may be larger than the first secondary distance along the first secondary part.

The second down conductor may be located at a second primary distance from the pressure side and a second secondary distance from the suction side. The second primary distance and second secondary distance along a second primary part may be substantially the same. For example, the second primary distance and the second secondary distance may be substantially the same throughout the majority of the second blade section.

In some portions of the wind turbine blade, e.g. near the second end or the tip end of the second blade section, the second primary distance and the first secondary distance may be different, e.g. to allow space for other components of the wind turbine blade and/or to allow for an easier connection of elements, such as connection the first down conductor and the second down conductor. For example, the second primary distance may be smaller than the second secondary distance along a second secondary part. Alternatively, the second primary distance may be larger than the second secondary distance along a second secondary part.

The wind turbine blade may comprise one or more hatches, such as a first hatch and/or a second hatch, e.g. to allow coupling of down conductors inside the wind turbine blade. A hatch of the wind turbine blade may be on the surface of the wind turbine blade, e.g. a hatch may be provided in the suction side of the wind turbine blade.

The first blade section may comprise the first hatch, e.g. near the first end of the first blade section. The first hatch may allow access to the interior of the first blade section between a first primary hatch position and a first secondary hatch position along the longitudinal axis.

The method of assembling the wind turbine blade may comprise opening a first hatch near the first end of the first blade section, such as the first hatch as described above, to allow access to the interior of the first blade section between a first primary hatch position and a first secondary hatch position along the longitudinal axis.

The conductive connector element and/or the first conductive connector element may be located underneath the first hatch. The conductive connector element and/or the first conductive connector element may be located at a first connector position between the first primary hatch position and the first secondary hatch position.

The second blade section may comprise the second hatch, e.g. near the second end of the second blade section. The second hatch may allow access to the interior of the second blade section between a second primary hatch position and a second secondary hatch position along the longitudinal axis.

The method of assembling the wind turbine blade may comprise opening a second hatch near the second end of the second blade section, such as the second hatch as described above, to allow access to the interior of the second blade section between a second primary hatch position and a second secondary hatch position along the longitudinal axis.

The first and/or second hatch may allow access to the interior of the blade, e.g. providing a way of connecting a first and a second down conductor, e.g. providing for a faster assembly of the wind turbine blade. The conductive connector element may provide a convenient way of coupling a first and a second down conductor.

The conductive connector element and/or the second conductive connector element may be located underneath the second hatch. The conductive connector element and/or the second conductive connector element may be located at a second connector position between the second primary hatch position and the second secondary hatch position.

The first down conductor may comprise a first down conductor portion, e.g. near the first end of the first blade section. The first down conductor portion may be configured to be movable. For example, the first down conductor may be configured to allow movement of the first down conductor portion, such as to allow a constructor to manipulate the first down conductor portion to a suitable position, e.g. during assembly of the first blade section and the second blade section.

The first down conductor, such as the first down conductor portion, may be configured to extend to a first down conductor position located in the second blade section. The first down conductor portion may be configured to be attached to the spar beam in the second blade section, such as between the second beam position and the third beam position. For example, the first down conductor portion may be repositioned to the second blade section and subsequently be attached to the spar beam in the second blade section.

The method of assembling the wind turbine blade may comprise attaching a first down conductor portion of the first down conductor, such as the first down conductor portion as described above, to the spar beam, e.g. in the second blade section, e.g. between the second beam position and the third beam position.

The second down conductor may comprise a second down conductor portion e.g. near the second end of the second blade section. The second down conductor portion may be configured to be movable. For example, the second down conductor may be configured to allow movement of the second down conductor portion, such as to allow a constructor to manipulate the second down conductor portion to a suitable position, e.g. during assembly of the first blade section and the second blade section.

The second down conductor, such as the second down conductor portion, may be configured to extend to a second down conductor position located in the first blade section. The second down conductor portion of the second down conductor may be configured to be attached to a shear web or side of a spar in the first blade section. For example, the second down conductor portion may be repositioned to the first blade section and subsequently be attached to the shear web or side of a spar in the first blade section.

The method of assembling the wind turbine blade may comprise attaching a second down conductor portion of the second down conductor, such as the second down conductor portion as described above, to a shear web in the first blade section.

Any of the mentioned beam positions may alternatively be denoted beam axis positions. Any of the mentioned beam positions, such as the third beam position, the fourth beam position, the fifth beam position, the sixth beam position, the seventh beam position, the eighth beam position, the ninth beam position, the tenth beam position, the eleventh beam position, the twelfth beam position, the thirteenth beam position, the fourteenth beam position and/or the fifteenth beam position, may be between the first beam end and the second beam end, such as between the first beam position and the second beam position.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
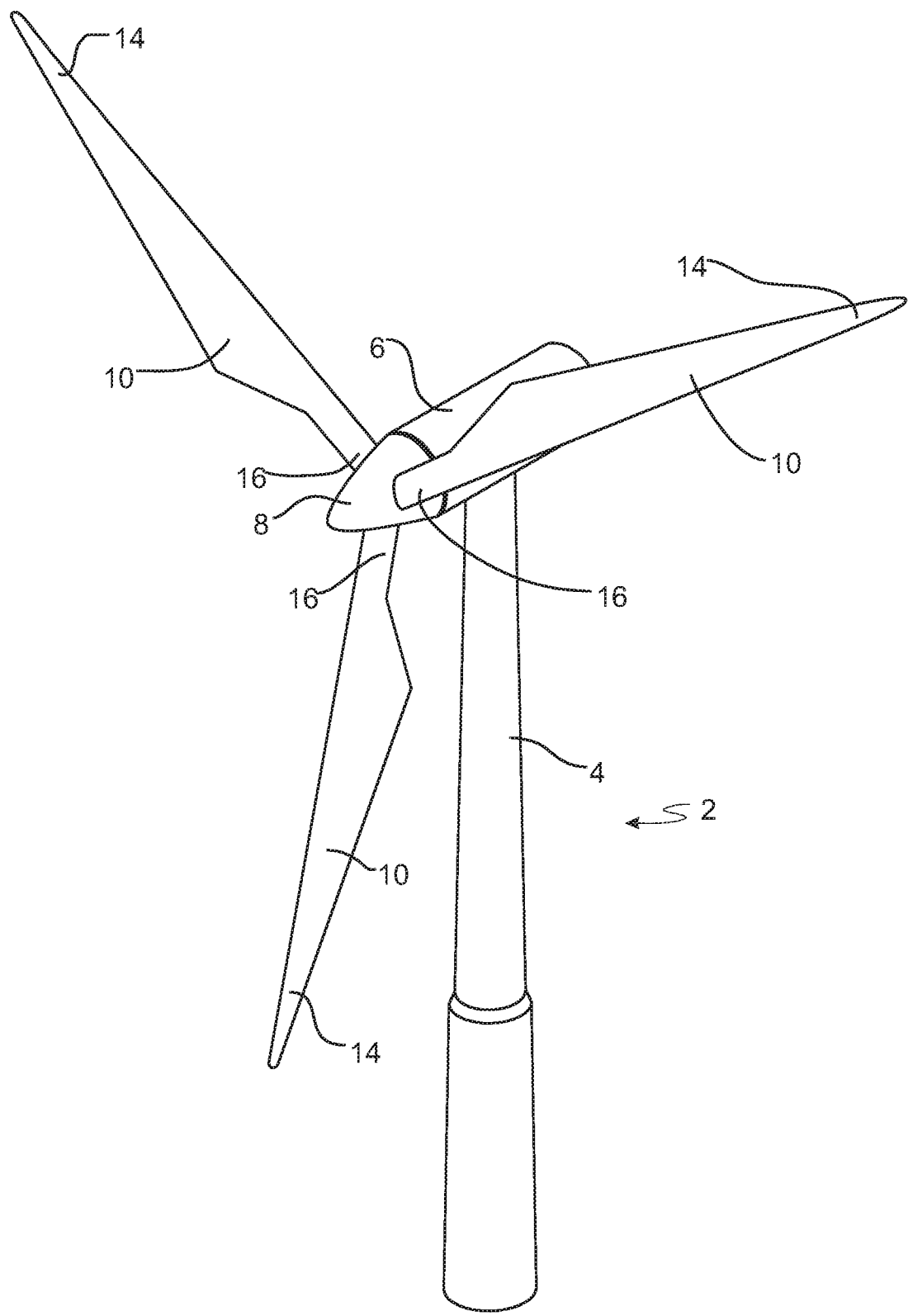
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
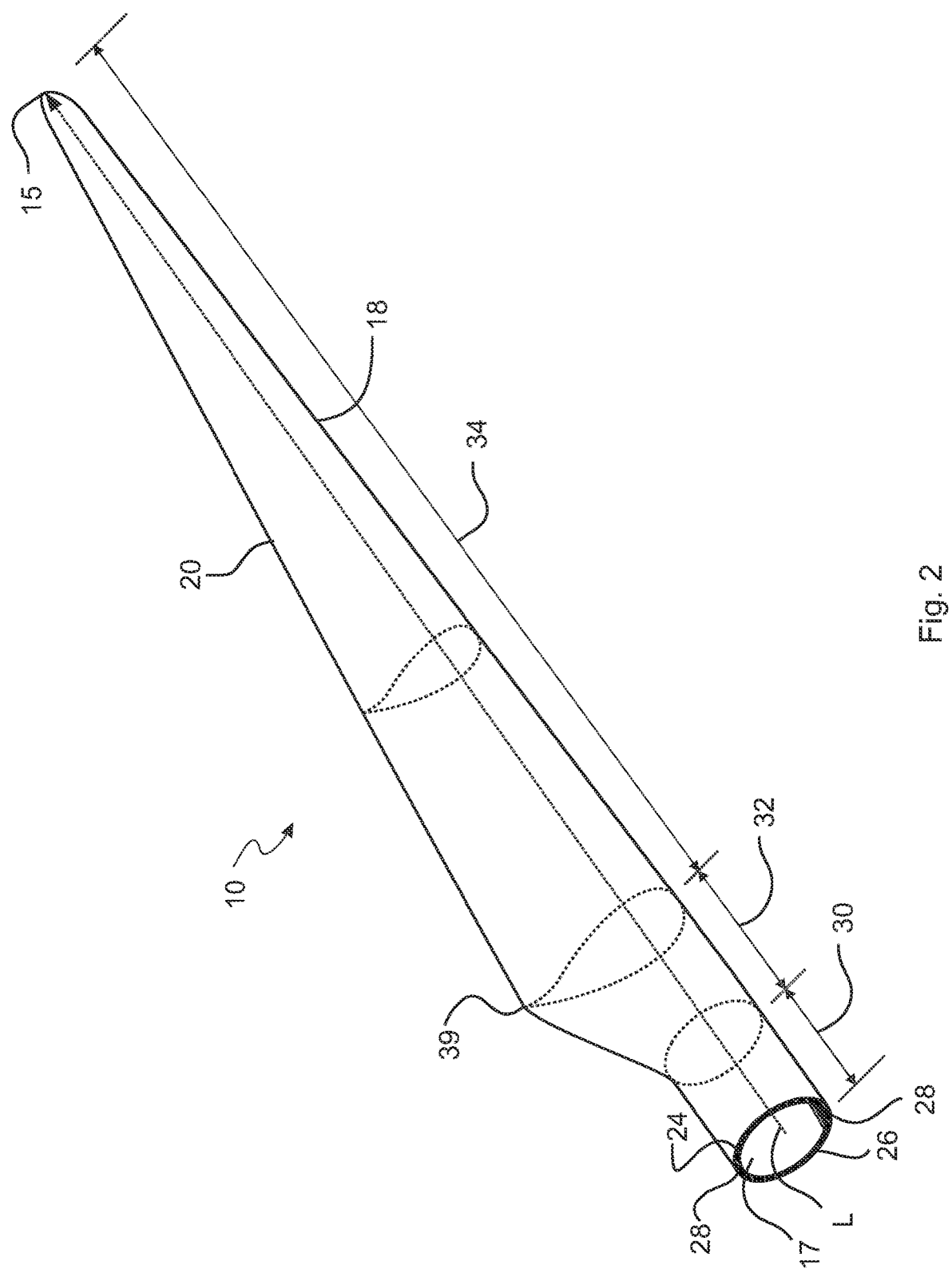
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 39 of the blade 10 is defined as the position, where the blade 10 has its largest chord length. The shoulder 39 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 extends along a longitudinal axis L. The root end 17 extends in a root end plane, substantially perpendicular to the longitudinal axis L.

Figure 3:
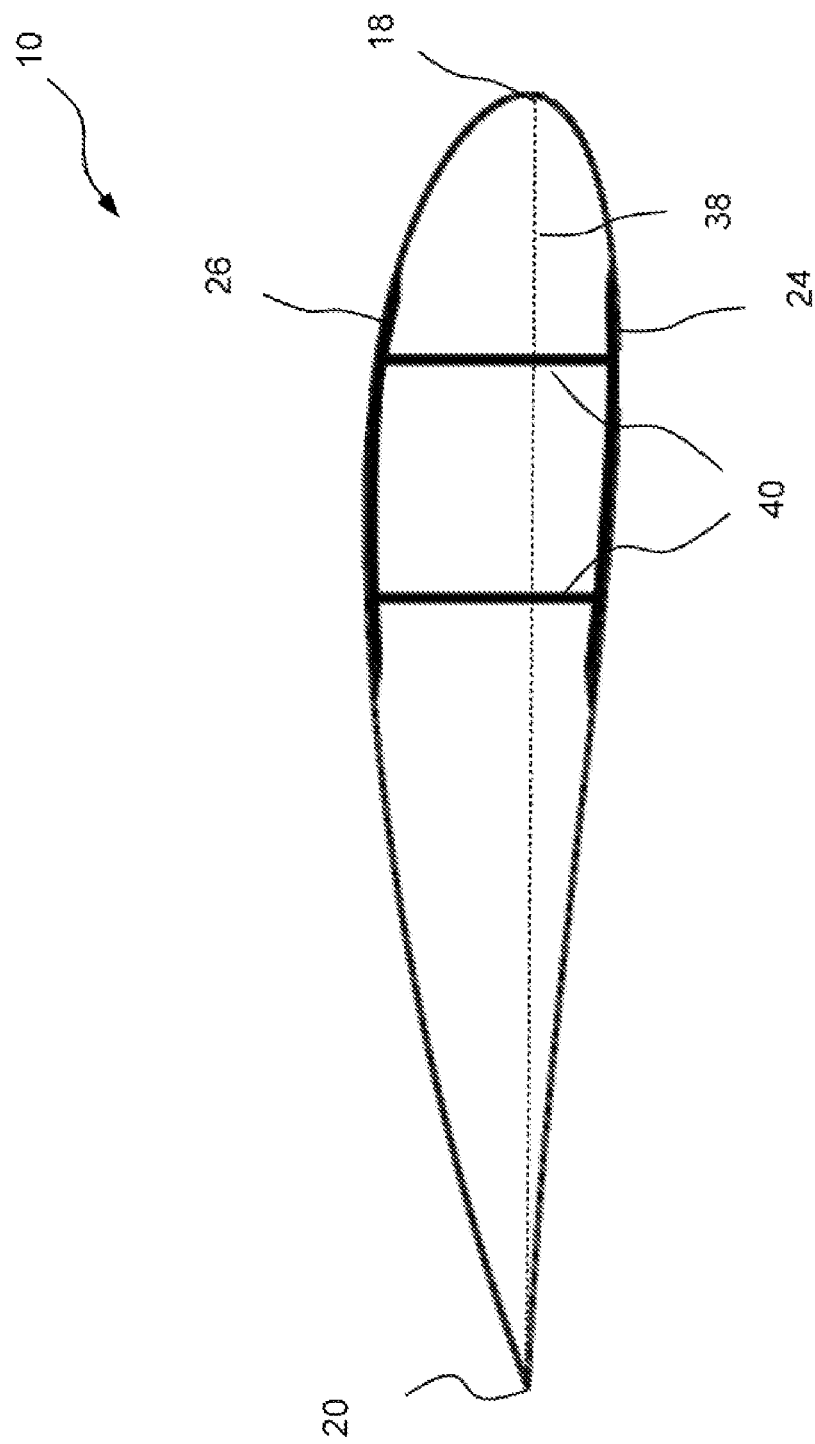
FIG. 3 is a schematic diagram illustrating a cross section of an exemplary wind turbine blade.

FIG. 3 is a schematic diagram illustrating a cross sectional view of an exemplary wind turbine blade 10, e.g. a cross sectional view of the airfoil region of the wind turbine blade 10. The wind turbine blade 10 comprises a leading edge 18, a trailing edge 20, a pressure side 24 and a suction side 26.

The wind turbine blade 10 comprises a chord line 38 between the leading edge 18 and the trailing edge 20.

The wind turbine blade 10 comprises shear webs 40, such as a leading edge shear web 40b and a trailing edge shear web 40a. The shear webs 40 could alternatively be a spar box with spar sides, such as a trailing edge spar side and a leading edge spar side.

Figure 4:
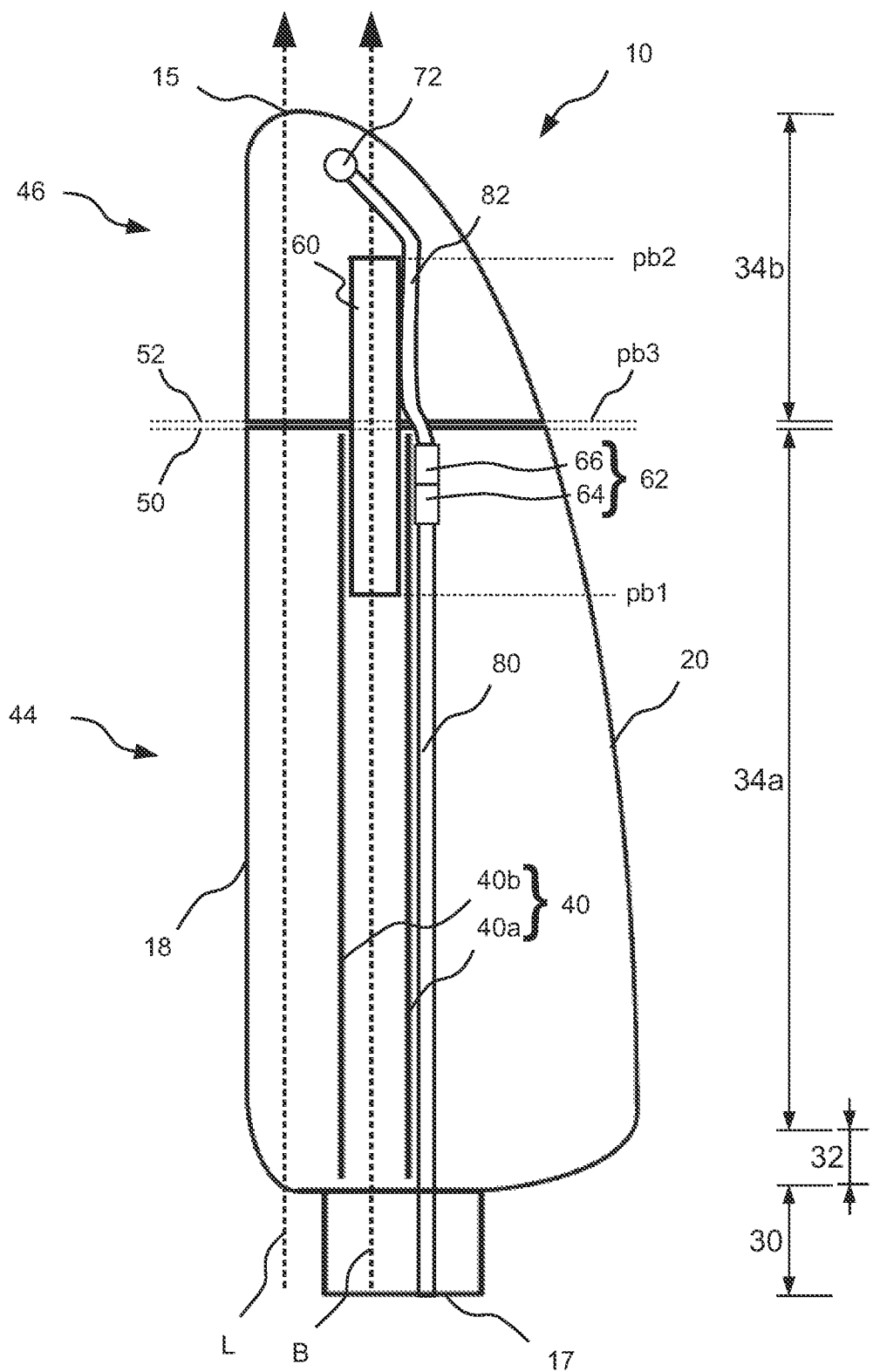
FIG. 4 is a schematic diagram illustrating an exemplary wind turbine blade.

FIG. 4 is a schematic diagram illustrating an exemplary wind turbine blade 10 seen from the suction side, such as the wind turbine blade 10 of the previous figures. The wind turbine blade 10 comprises a leading edge 18, a trailing edge 20, a tip end 15 and a root end 17. The wind turbine blade 10 comprises shear webs 40, such as a leading edge shear web 40b and a trailing edge shear web 40a.

The wind turbine blade 10 is a so-called split blade, or two-part blade, or segmented blade. The wind turbine blade 10 comprises a first blade section 44 and a second blade section 46. The first blade section 44 extends along the longitudinal axis L from a root, such as the root end 17, to a first end 50. The second blade section 46 extends along the longitudinal axis L from a second end 52 to a tip, such as the tip end 15. The first blade section comprises 44 a root region 30, a first airfoil region 34a and a transition region 32 between the root region 30 and the first airfoil region 34a. The second blade section 46 comprises a second airfoil region 34b with the tip, such as the tip end 15. The first blade section 44 and the second blade section 46 may be connected with a spar beam 60. The spar beam 60 may comprise carbon fibre, e.g. the spar beam 60 may comprise pultruded carbon fibre reinforced polymer.

The spar beam 60 extends along a spar beam axis B. The spar beam axis B may be coinciding and/or parallel with the longitudinal axis of the wind turbine blade 10. The spar beam 60 extends from a first beam position pb1 in the first airfoil region 34a to a second beam position pb2 in the second airfoil region 34b.

A third beam position pb3 is between the first beam position pb1 and second beam position pb2. The third beam position pb3 is aligned with the second end 52 of the second blade section 46.

A lightning conductor extends from the root end 17 towards the tip end 15. The lightning conductor comprises a first down conductor 80 in the first blade section 44 and a second down conductor 82 in the second blade section 46. The first down conductor 80 is attached to the trailing edge shear web 40a. Alternatively or additionally, the first down conductor 80 may be attached to the leading edge shear web 40b. The second down conductor 82 is attached to the spar beam 60 in the second blade section 46. The first down conductor 80 and the second down conductor 82 may be attached to the shear web or the spar beam with e.g. to a bracket, by soldering and/or other suitable means. The second down conductor 82 is connected to a lightning receptor 72. Although not illustrated, the wind turbine blade 10 may comprise a plurality of lightning receptors being connected to the first down conductor 80 and/or the second down conductor 82.

The lightning conductor comprises a conductive connector element 62. The conductive connector element 62 is located in the first blade section 44. The conductive connector element 62 may alternatively be located in the second blade section 46 (see e.g. FIG. 6b or FIG. 7b). The conductive connector element 62 may be one element, which for example, may be in electrical and/or mechanical connection with the first down conductor 80 before assembly of the first blade section 44 and the second blade section 46 of the wind turbine blade 10. Alternatively, the conductive connector element 62 may be in electrical and/or mechanical connection with the second down conductor 82 before assembly of the first blade section 44 and the second blade section 46 of the wind turbine blade 10. The conductive connector element 62 may, for example, be a cable shoe, which can be clamped around a part of the first down conductor 80 and/or a part of the second down conductor 82. After assembly of the first blade section 44 and the second blade section 46 of the wind turbine blade 10, the conductive connector element 62 is electrically and/or mechanically coupled to the first down conductor 80 and the second down conductor 82.

Alternatively, the conductive connector element may comprise a first conductive connector element 64 in electrical connection with the first down conductor 80 and a second conductive connector element 66 in electrical connection with the second down conductor 82, which are to be connected to form the conductive connector element. For example, the first conductive connector element 64 may be a plug and the second conductive connector element 66 may be a socket. Alternatively, the first conductive connector element 64 may be a socket and the second conductive connector element 66 may be a plug.

Figure 5:
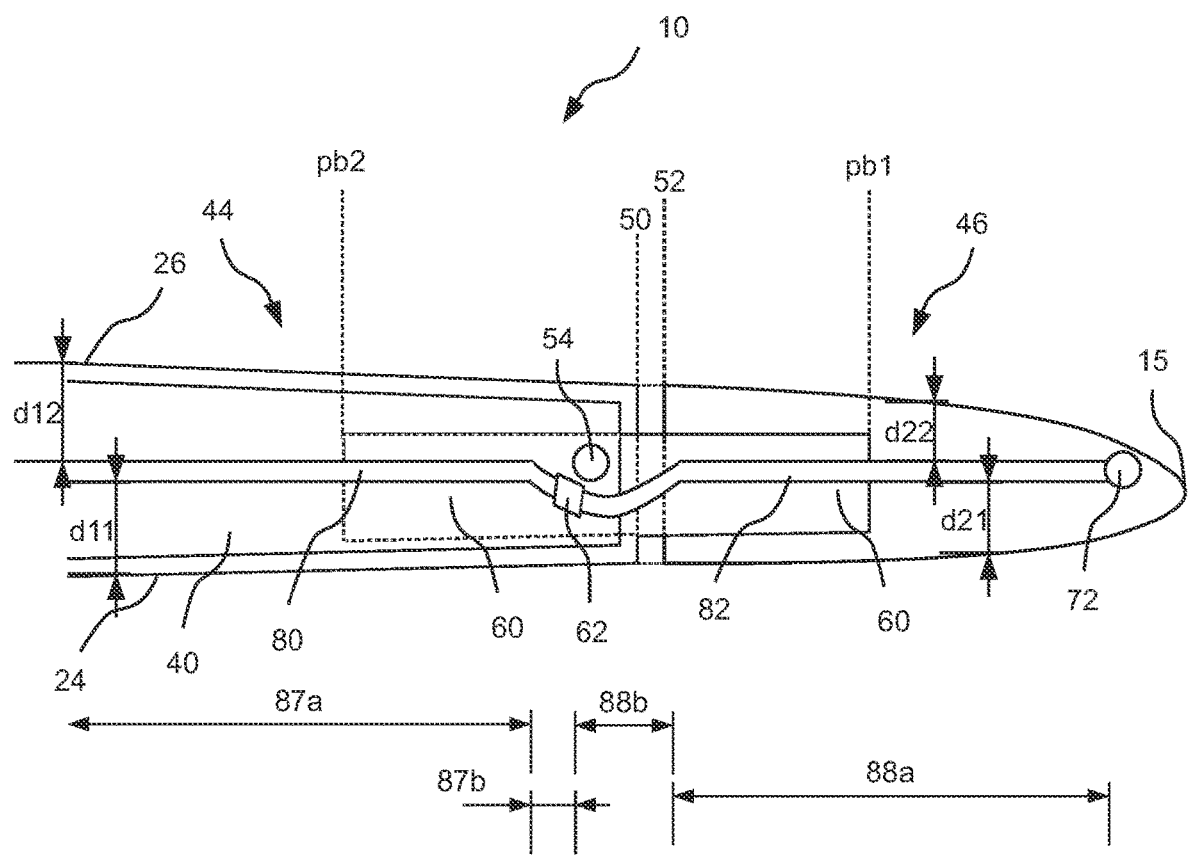
FIG. 5 is a schematic diagram illustrating part of an exemplary wind turbine blade.

FIG. 5 is a schematic diagram illustrating part of an exemplary wind turbine blade 10 seen from the trailing edge, such as the wind turbine blade 10 of the previous figures. The wind turbine blade 10 comprises a pressure side 24, a suction side 26, a tip end 15, a first blade section 44, a second blade section 46, a shear web 40 and a spar beam 60. For illustrative purposes the shear web 40 and the spar beam 60 are drawn separately from the shell parts 26 and 24. The wind turbine blade 10 comprises a first down conductor 80 located in the first blade section 44, a second down conductor 82 located in the second blade section 46, and a conductive connector element 62 coupling the first down conductor 80 and the second down conductor 82. The second down conductor 82 is connected to a lightning receptor 72.

The first down conductor 80 is located at a first primary distance d11 from the pressure side 24 and a first secondary distance d12 from the suction side 26. The first primary distance d11 and the first secondary distance d12 along a first primary part 87a is substantially the same, e.g. to reduce the risk of lightning striking the first down conductor 80.

The second down conductor 82 is located at a second primary distance d21 from the pressure side 24 and a second secondary distance d22 from the suction side 26. The second primary distance d21 and second secondary distance d22 along a second primary part 88a is substantially the same, e.g. to reduce the risk of lightning striking the second down conductor 82.

The first primary distance d11 and the first secondary distance d12 along a first secondary part 87b is different, e.g. the first primary distance d11 is smaller than the first secondary distance d12 along the first secondary part 87b. The second primary distance d21 and the second secondary distance d22 along a second secondary part 88b is different, e.g. the second primary distance d21 is smaller than the second secondary distance d12 along the second secondary part 88b. Thus, the first down conductor 80, the conductive connector element 62 and the second down conductor 82 may be configured to run under an assembly point 54 in a plane parallel to the shear web 40. Alternatively, the first primary distance d11 may be larger than the first secondary distance d12 along the first secondary part 87b and/or the second primary distance d21 may be larger than the second secondary distance d12 along the second secondary part 88b. Thus, the first down conductor 80, the conductive connector element 62 and the second down conductor 82 may be configured to run over the assembly point 54 in a plane parallel to the shear web 40. The assembly point 54 may be a hole through the shear web 40 and the spar beam 60, e.g. configured to receive a pin, such as to lock the spar beam 60 in position with respect to the first blade section 44.

Figure 6A:
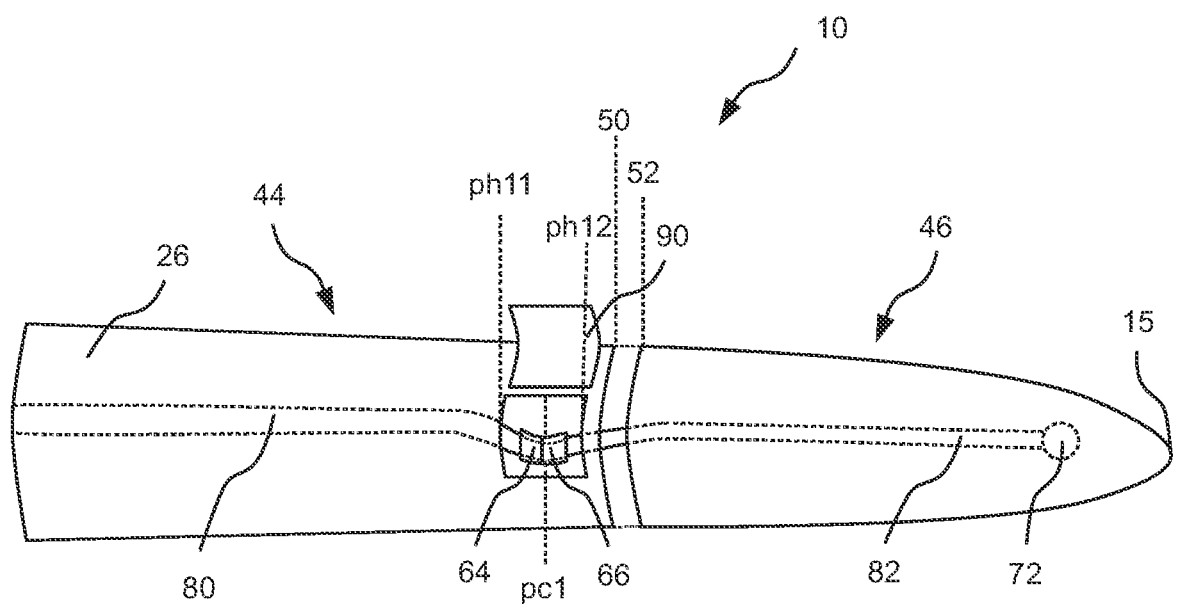
FIG. 6a is a schematic diagram illustrating part of an exemplary wind turbine blade.
Figure 6B:
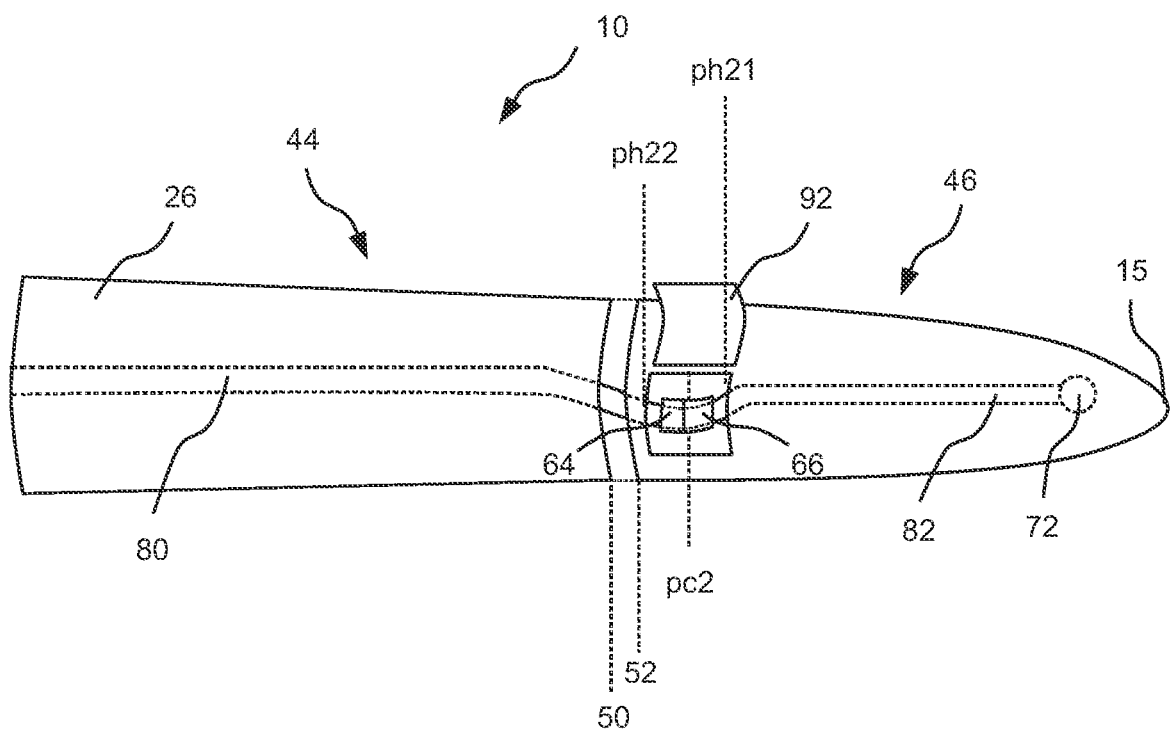
FIG. 6b is a schematic diagram illustrating part of an exemplary wind turbine blade.

FIGS. 6a and 6b are schematic diagrams illustrating part of an exemplary wind turbine blade 10, such as the wind turbine blade 10 of the previous figures. The wind turbine blade 10 comprises a pressure side (not visible), a suction side 26, a tip end 15, a first blade section 44, a second blade section 46, a shear web 40 and a spar beam 60. The wind turbine blade 10 comprises a first down conductor 80 located in the first blade section 44 and a second down conductor 82 located in the second blade section 46. The wind turbine blade 10 comprises a first conductive connector element 64 in electrical connection with the first down conductor 80 and a second conductive connector element 66 in electrical connection with the second down conductor 82. The first conductive connector element 64 and the second conductive connector element 66 electrically and/or mechanically couple the first down conductor 80 and the second down conductor 82. The second down conductor 82 is connected, such as electrically connected, to a lightning receptor 72. The first conductive connector element 64 and the second conductive connector element 66 may be positioned and/or coupled in the first blade section 44 (FIG. 6a) or in the second blade section 46 (FIG. 6b).

FIG. 6a illustrates, the wind turbine blade 10 comprising a first hatch 90 near the first end 50 of the first blade section 44. The first hatch 90 is provided in the suction side 26 of the wind turbine blade 10. The first hatch 90 allows access to the interior of the first blade section 44 between a first primary hatch position ph11 and a first secondary hatch position ph12 along the longitudinal axis L. The first conductive connector element 64, e.g. a first end, a second end or a centre position of the first conductive connector element 64, is located at a first connector position pc1 between the first primary hatch position ph11 and the first secondary hatch position ph12. By opening the first hatch 90 the first conductive connector element 64 and the second conductive connector element 66 may be accessed and coupled.

FIG. 6b illustrates the wind turbine blade 10 comprising a second hatch 92 near the second end 52 of the second blade section 46. The second hatch 92 is provided in the suction side 26 of the wind turbine blade 10. The second hatch 92 allows access to the interior of the second blade section 46 between a second primary hatch position ph21 and a second secondary hatch position ph22 along the longitudinal axis L. The second conductive connector element 66, e.g. a first end, a second end or a centre position of the second conductive connector element 66, is located at a second connector position pc2 between the second primary hatch position ph21 and the second secondary hatch position ph22. By opening the second hatch 92 the first conductive connector element 64 and the second conductive connector element 66 may be accessed and coupled.

The wind turbine blade 10 may comprise both a first hatch 90 as illustrated in FIG. 6a, and a second hatch 92 as illustrated in FIG. 6b.

Figure 7A:
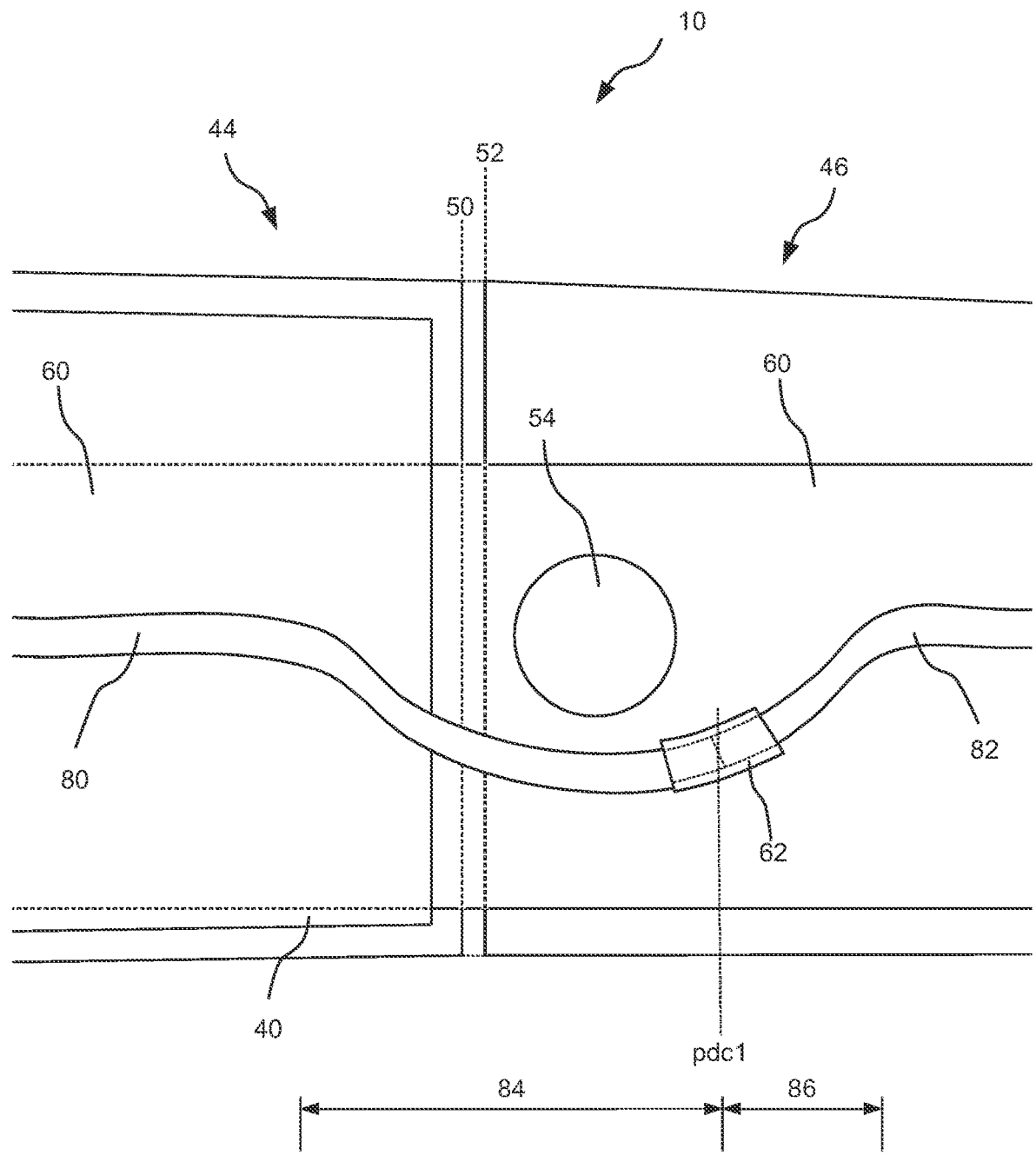
FIG. 7a is a schematic diagram illustrating part of an exemplary wind turbine blade.
Figure 7B:
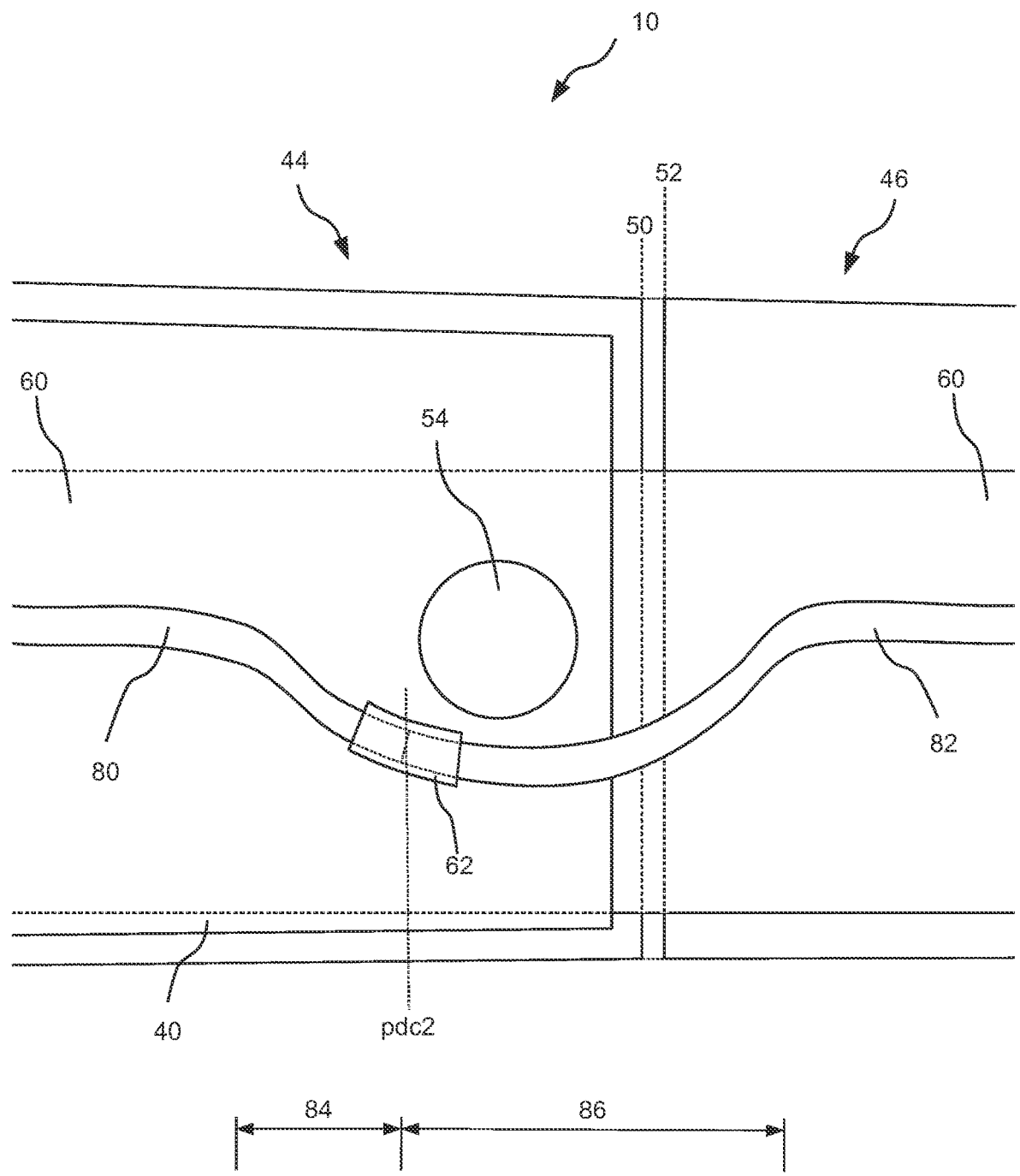
FIG. 7b is a schematic diagram illustrating part of an exemplary wind turbine blade.

FIGS. 7a and 7b are schematic diagrams illustrating part of an exemplary wind turbine blade 10, such as the wind turbine blade 10 of the previous figures. The wind turbine blade 10 comprises a first blade section 44, a second blade section 46, a shear web 40 and a spar beam 60. For illustrative purposes the shear web 40 and the spar beam 60 are drawn separate from the shell parts 26, 24. The wind turbine blade 10 comprises a first down conductor 80 located in the first blade section 44, a second down conductor 82 located in the second blade section 46, and a conductive connector element 62 coupling the first down conductor 80 and the second down conductor 82.

The conductive connector element 62 may be a single element coupling the first down conductor 80 and the second down conductor 82.

FIG. 7a illustrates, the first down conductor 80 comprising a first down conductor portion 84 near the first end 50 of the first blade section 44. The first down conductor portion 84 is configured to be movable, such as to allow manipulation of the first down conductor portion 84 into the second blade section 46 and/or to allow coupling of the first down conductor 80 and the second down conductor 82. The first down conductor 80 is configured to extend to a first down conductor position pdc1, e.g. located in the second blade section 46, such as in a second airfoil region of the second blade section 46, as illustrated. The second connector position pc2 of FIG. 6b may be the same as the first down conductor position pdc1. The first down conductor portion 84 is configured to be attached to the spar beam 60 of the second blade section 46, e.g. to reduce mechanical stress caused by movement of the first down conductor portion 84, when the wind turbine blade 10 is in operation. The first down conductor 80, the conductive connector element 62 and the second down conductor 82 is configured to run under an assembly point 54 in a plane parallel to the shear web 40. Alternatively, the first down conductor 80, the conductive connector element 62 and the second down conductor 82 is configured to run over an assembly point 54 in a plane parallel to the shear web 40.

FIG. 7b illustrates, the second down conductor 82 comprising a second down conductor portion 86 near the second end 52 of the second blade section 46. The second down conductor portion 86 is configured to be movable, such as to allow manipulation of the second down conductor portion 86 into the first blade section 44 and/or to allow coupling of the first down conductor 80 and the second down conductor 82. The second down conductor 82 is configured to extend to a second down conductor position pdc2, e.g. located in the first blade section 44, such as in a first airfoil region of the first blade section 44, as illustrated. The first connector position pc1 of FIG. 6a may be the same as the second down conductor position pdc2. The second down conductor portion 86 is configured to be attached to the shear web 40 of the first blade section 44, e.g. to reduce mechanical stress caused by movement of the second down conductor portion 86, when the wind turbine blade 10 is in operation. The second down conductor 80, the conductive connector element 62 and the second down conductor 82 is configured to run under an assembly point 54 in a plane parallel to the shear web 40. Alternatively, the first down conductor 80, the conductive connector element 62 and the second down conductor 82 is configured to run over an assembly point 54 in a plane parallel to the shear web 40.

Figure 8:
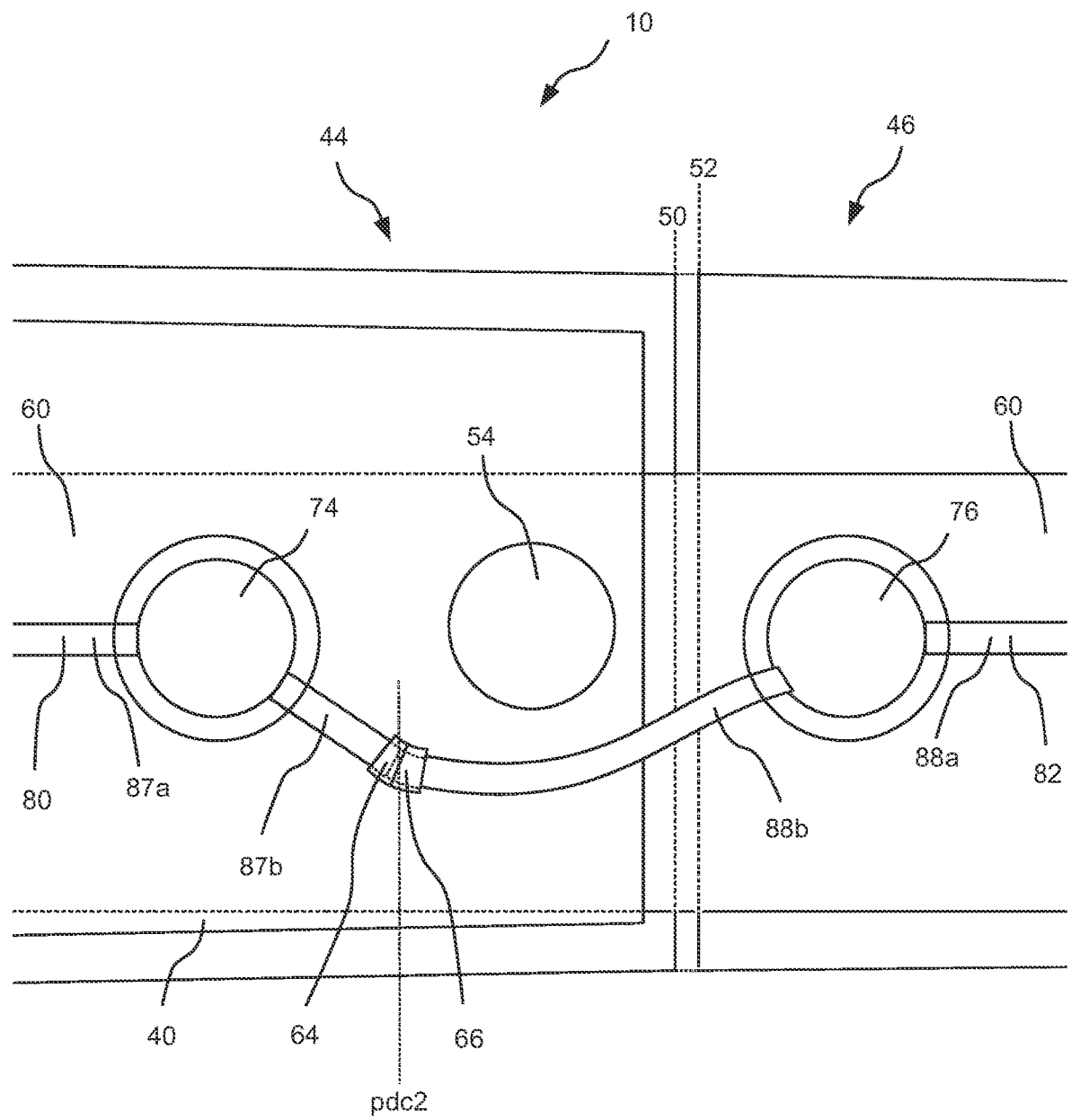
FIG. 8 is a schematic diagram illustrating part of an exemplary wind turbine blade.

FIG. 8 is a schematic diagram illustrating part of an exemplary wind turbine blade 10, such as the wind turbine blade 10 of the previous figures. The wind turbine blade 10 comprises a first blade section 44, a second blade section 46, a shear web 40 and a spar beam 60. For illustrative purposes the shear web 40 and the spar beam 60 are drawn separately from the shell parts 26, 24. The wind turbine blade 10 comprises a first down conductor 80 located in the first blade section 44 and a second down conductor 82 located in the second blade section 46. The first down conductor 80 comprises a first primary part 87a and a first secondary part 87b. The second down conductor 82 comprises a second primary part 88a and a second secondary part 88b. The wind turbine blade 10 comprises a first connection part 74 in the first blade section 44 connecting the first primary part 87a and the first secondary part 87b of the first down conductor 80. The first connection part 74 is configured to provide for electrically connecting a lightning receptor, such as a receptor cable from the lightning receptor, to the first down conductor 80. The wind turbine blade 10 comprises a second connection part 76 in the second blade section 46 connecting the second primary part 88a and the second secondary part 88b of the second down conductor 82. The second connection part 76 is configured to provide for electrically connecting a lightning receptor, such as a receptor cable from the lightning receptor, to the second down conductor 82. The connection part(s) 74, 76 may be formed by exothermal welding together the respective cable parts.

The wind turbine blade 10 comprises a first conductive connector element 64 in electrical connection with the first down conductor 80 and a second conductive connector element 64 in electrical connection with the second down conductor 82. The first conductive connector element 64 and the second conductive connector element 66 electrically and/or mechanically couple the first down conductor 80 and the second down conductor 82.

The second down conductor 82 comprises a second secondary part 88b near the second end 52 of the second blade section 46. The second secondary part 88b is configured to be movable, such as to allow manipulation of the second secondary part 88b into the first blade section 44 and/or to allow coupling of the first down conductor 80 and the second down conductor 82. The second down conductor 82 is configured to extend to a second down conductor position pdc2, e.g. located in the first blade section 44, such as in a first airfoil region of the first blade section 44, as illustrated. The second secondary part 88b may be configured to be attached to the shear web 40 of the first blade section 44. The first down conductor 80, the conductive connector element 62 and the second down conductor 82 is configured to run under an assembly point 54 in a plane parallel to the shear web 40. Alternatively, the first down conductor 80, the conductive connector element 62 and the second down conductor 82 may be configured to run over an assembly point 54 in a plane parallel to the shear web 40.

Figure 9:
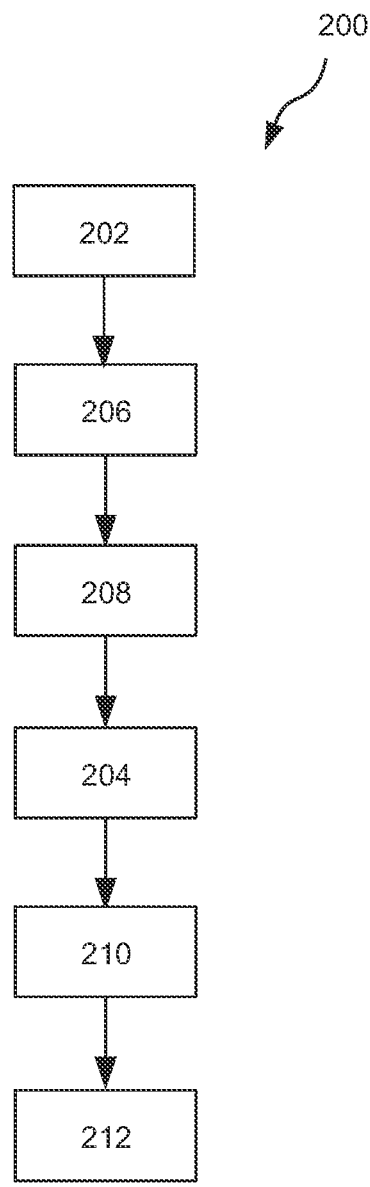
FIG. 9 is a flow diagram illustrating an exemplary method for assembling an exemplary wind turbine blade.

FIG. 9 is a flow diagram illustrating an exemplary method 200 for assembling a wind turbine blade, such as a wind turbine blade as described in relation to previous figures, such as a wind turbine blade comprising a first blade section extending along a longitudinal axis from a root end to a first end and a second blade section extending along the longitudinal axis from a second end to a tip end. The first blade section comprises a root region and a first airfoil region. The second blade section comprises a second airfoil region with the tip end. The first blade section and the second blade section comprise a pressure side and a suction side. The wind turbine blade comprises a spar beam configured for connecting the first blade section and the second blade section. The spar beam longitudinally extends along a spar beam axis from a first beam position to a second beam position. The first blade section comprises a first down conductor and the second blade section comprises a second down conductor. The method 200 comprises positioning 202 the spar beam such that the first beam position is located in the first airfoil region and the second beam position is located in the second airfoil region.

The method 200 comprises electrically connecting 204 the first down conductor and the second down conductor with a conductive connector element, e.g. comprising a first conductive connector element and a second conductive connector element. The first conductive connector element may be in electrical connection with the first down conductor and the second conductive connector element may be in electrical connection with the second down conductor. Electrically connecting 204 the first down conductor and the second down conductor may comprise clamping or soldering the conductive connector element and the first down conductor and the second down conductor.

Electrically connecting 204 the first down conductor and the second down conductor may comprise coupling the first conductive connector element and the second conductive connector element. Coupling the first conductive connector element and the second conductive connector element may comprise clamping, soldering, bolting or mating the first conductive connector element and the second conductive connector element.

The method 200 may comprise opening 206 a first hatch, e.g. near the first end of the first blade section. Opening 206 the first hatch may allow access to the interior of the first blade section between a first primary hatch position and a first secondary hatch position along the longitudinal axis of the wind turbine blade.

The method 200 may comprise opening 208 a second hatch, e.g. near the second end of the second blade section. Opening 208 the second hatch may allow access to the interior of the second blade section between a second primary hatch position and a second secondary hatch position along the longitudinal axis of the wind turbine blade.

Opening 206 the first hatch and/or opening 208 the second hatch may be performed prior to electrically connecting 204 the first down conductor and the second down conductor.

The method 200 may comprise attaching 210 a first down conductor portion of the first down conductor to the spar beam, e.g. between the second beam position and a third beam position in the second blade section. The third beam position may be a position of the spar beam aligned with the first end of the first blade section and/or the second end of the second blade section.

The method 200 may comprise attaching 212 a second down conductor portion of the second down conductor to a shear web in the first blade section.

The term "receptor" is to be understood as an electrically conductive object being configured with a view to capturing and conducting a lightning current.

Throughout the disclosure, the term "conductive", if not specified otherwise, is to be understood as electrically conductive.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
34a first airfoil region
34b second airfoil region
38 cord line
39 shoulder
40 shear web or spar side
40a trailing edge shear web
40b leading edge shear web
44 first blade section
46 second blade section
50 first end
52 second end
54 assembly point
60 spar beam
62 conductive connector element
64 first conductive connector element
66 second conductive connector element
72 lightning receptor
74 first receptor disc
76 second receptor disc
80 first down conductor
82 second down conductor
84 first down conductor portion
86 second down conductor portion
87a first primary part
87b first secondary part
88a second primary part
88b second secondary part
90 first hatch
92 second hatch
B spar beam axis
L longitudinal axis
pb1 first beam position
pb2 second beam position
pb3 third beam position
d11 first primary distance
d12 first secondary distance
d21 second primary distance
d22 second secondary distance
ph11 first primary hatch position
ph12 first secondary hatch position
ph21 second primary hatch position
ph22 second secondary hatch position
pc1 first connector position
pc2 second connector position
pdc1 first down conductor position
pdc2 second down conductor position

The invention claimed is:

1. A wind turbine blade extending along a longitudinal axis from a root end through a first airfoil region and a second airfoil region to a tip end, the wind turbine blade comprising:
  a first blade section extending along the longitudinal axis to a first end;
  a second blade section extending along the longitudinal axis from a second end towards the tip end, the first blade section comprising the first airfoil region, and the second blade section comprising the second airfoil region, the first blade section and the second blade section comprising a pressure side and a suction side, wherein the first end of the first blade section is closer to the root end than the second end of the second blade section, and wherein the second end of the second blade section is closer to the tip end than the first end of the first blade section;

a spar beam configured for structurally connecting the first blade section and the second blade section, the spar beam longitudinally extending along a spar beam axis from a first beam position to a second beam position and being configured to be positioned such that the first beam position is located in the first airfoil region and the second beam position is located in the second airfoil region, wherein the first blade section comprises a first down conductor and the second blade section comprises a second down conductor; and a conductive connector element for electrically connecting the first down conductor and the second down conductor, wherein the first down conductor is configured to extend to a first down conductor position located in the second blade section or the second down conductor is configured to extend to a second down conductor position located in the first blade section, and wherein the first down conductor and the second down conductor are positioned within the wind turbine blade and are continuously spaced apart from a pressure side shell part and a suction side shell part of each of the first and second blade sections.

2. The wind turbine blade according to claim 1, wherein the conductive connector element comprises a first conductive connector element in electrical connection with the first down conductor, and wherein the conductive connector element comprises a second conductive connector element in electrical connection with the second down conductor, the first conductive connector element and the second conductive connector element being configured to couple to electrically connect the first down conductor and the second down conductor.

3. The wind turbine blade according to claim 2, wherein the first conductive connector element comprises a plug, and wherein the second conductive connector element comprises a socket.

4. The wind turbine blade according to claim 1, wherein the first blade section comprises a first hatch near the first end of the first blade section, to allow access to the interior of the first blade section between a first primary hatch position and a first secondary hatch position along the longitudinal axis.

5. The wind turbine blade according to claim 4, wherein the first conductive connector element is located at a first connector position between the first primary hatch position and the first secondary hatch position.

6. The wind turbine blade according to claim 1, wherein the second blade section comprises a second hatch near the second end of the second blade section, to allow access to the interior of the second blade section between a second primary hatch position and a second secondary hatch position along the longitudinal axis.

7. The wind turbine blade according to claim 6, wherein the second conductive connector element is located at a second connector position between the second primary hatch position and the second secondary hatch position.

8. The wind turbine blade according to claim 1, wherein the first down conductor comprises a first down conductor portion near the first end of the first blade section, the first down conductor portion being configured to be movable and, optionally wherein the first down conductor portion of the first down conductor is attached to the spar beam between the second beam position and a third beam position; and/or wherein the second down conductor comprises a second down conductor portion near the second end of the second blade section, the second down conductor portion being configured to be movable and, optionally wherein the second down conductor portion of the second down conductor is attached to a shear web in the first blade section.

9. The wind turbine blade according to claim 1, wherein a first shell of the first blade section and a second shell of the second blade section define a full airfoil shell of the wind turbine blade.

10. A method for assembling a wind turbine blade extending along a longitudinal axis from a root end through a first airfoil region and a second airfoil region to a tip end, the wind turbine blade comprising a first blade section extending along the longitudinal axis to a first end and a second blade section extending along the longitudinal axis from a second end towards the tip end, wherein the first end of the first blade section is closer to the root end than the second end of the second blade section, and wherein the second end of the second blade section is closer to the tip end than the first end of the first blade section, the first blade section comprising the first airfoil region, the second blade section comprising the second airfoil region, the first blade section and the second blade section comprises a pressure side and a suction side, the wind turbine blade comprising a spar beam configured for structurally connecting the first blade section and the second blade section, the spar beam longitudinally extending along a spar beam axis from a first beam position to a second beam position, the first blade section comprises a first down conductor and the second blade section comprises a second down conductor, wherein the first down conductor is configured to extend to a first down conductor position located in the second blade section or the second down conductor is configured to extend to a second down conductor position located in the first blade section, and wherein the first down conductor and the second down conductor are positioned within the wind turbine blade and are continuously spaced apart from a pressure side shell part and a suction side shell part of each of the first and second blade sections, wherein the method comprises:

positioning the spar beam such that the first beam position is located in the first airfoil region and the second beam position is located in the second airfoil region; and electrically connecting the first down conductor and the second down conductor with a conductive connector element.

11. The method according to claim 10, wherein the method comprises opening a first hatch near the first end of the first blade section, to allow access to the interior of the first blade section between a first primary hatch position and a first secondary hatch position along the longitudinal axis.

12. The method according to claim 10, wherein the method comprises opening a second hatch near the second end of the second blade section, to allow access to the interior of the second blade section between a second primary hatch position and a second secondary hatch position along the longitudinal axis.

13. The method according to claim 10, wherein the conductive connector element comprises a first conductive connector element and a second conductive connector element, wherein the first conductive connector element is in electrical connection with the first down conductor and the second conductive connector element is in electrical connection with the second down conductor, and wherein electrically connecting the first down conductor and the second down conductor comprises coupling the first conductive connector element and the second conductive connector element.

14. The method according to claim 10, wherein the method comprises attaching a first down conductor portion of the first down conductor to the spar beam between the second beam position and a third beam position.

15. The method according to claim 10, wherein the method comprises attaching a second down conductor portion of the second down conductor to a shear web in the first blade section.

16. A wind turbine blade extending along a longitudinal axis from a root end through a first airfoil region and a second airfoil region to a tip end, the wind turbine blade comprising:
- a first blade section extending along the longitudinal axis to a first end;
- a second blade section extending along the longitudinal axis from a second end towards the tip end, the first blade section comprising the first airfoil region, and the second blade section comprising the second airfoil region, the first blade section and the second blade section comprising a pressure side and a suction side;
- a spar beam configured for structurally connecting the first blade section and the second blade section, the spar beam longitudinally extending along a spar beam axis from a first beam position to a second beam position and being configured to be positioned such that the first beam position is located in the first airfoil region and the second beam position is located in the second airfoil region, wherein the first blade section comprises a first down conductor and the second blade section comprises a second down conductor; and
- a conductive connector element for electrically connecting the first down conductor and the second down conductor, wherein the first down conductor is configured to extend to a first down conductor position located in the second blade section or the second down conductor is configured to extend to a second down conductor position located in the first blade section, and wherein the first down conductor and the second down conductor are positioned within the wind turbine blade and are continuously spaced apart from a pressure side shell part and a suction side shell part of each of the first and second blade sections, wherein the first blade section comprises a first hatch near the first end of the first blade section, to allow access to the interior of the first blade section between a first primary hatch position and a first secondary hatch position along the longitudinal axis, the first conductive connector element being located at a first connector position between the first primary hatch position and the first secondary hatch position, or wherein the second blade section comprises a second hatch near the second end of the second blade section, to allow access to the interior of the second blade section between a second primary hatch position and a second secondary hatch position along the longitudinal axis, the second conductive connector element being located at a second connector position between the second primary hatch position and the second secondary hatch position.

* * * * *